United States Patent [19]

Aoki et al.

[11] 4,072,482
[45] Feb. 7, 1978

[54] CONTINUOUS DEODORIZING APPARATUS OF FAT AND OIL

[75] Inventors: Makoto Aoki, Machida; Tadao Nishiyama, Yokohama, both of Japan

[73] Assignees: The Nisshin Oil Mills, Ltd.; JGC Corporation, both of Tokyo, Japan

[21] Appl. No.: 698,124

[22] Filed: June 21, 1976

[51] Int. Cl.$^2$ .............................................. B01D 19/00
[52] U.S. Cl. ........................................ 55/195; 55/208; 55/222
[58] Field of Search ............... 55/20, 80, 93, 94, 95, 55/222, 195, 208, 228

[56] References Cited

U.S. PATENT DOCUMENTS

| 3,183,645 | 5/1965 | Teller | 55/20 |
| 3,338,029 | 8/1967 | Warfield, Jr. | 55/94 X |
| 3,395,510 | 8/1968 | Barnes | 55/94 X |

FOREIGN PATENT DOCUMENTS 465,818  2/1971  Japan.

Primary Examiner—John Adee
Assistant Examiner—E. Rollins Gross
Attorney, Agent, or Firm—Cushman, Darby & Cushman

[57] ABSTRACT

A continuous deodorizing apparatus for fat and oil comprising a deodorizing tower, a steam ejector for keeping the pressure inside the deodorizing tower at a vacuum and a steam superheater, the deodorizing tower housing a heating tray disposed uppermost, a charge control tray beneath the heating tray, a heat exchange tray at the bottom, a discharge control tray just above the heat exchange tray, and at least one deodorizing tray disposed between the charge control tray and the discharge control tray. The superheated steam generated by the steam superheater is used as the heat transfer medium for heating the feedstock fat and oil in the heating tray and, then utilized as the operating steam of the steam ejector.

5 Claims, 1 Drawing Figure

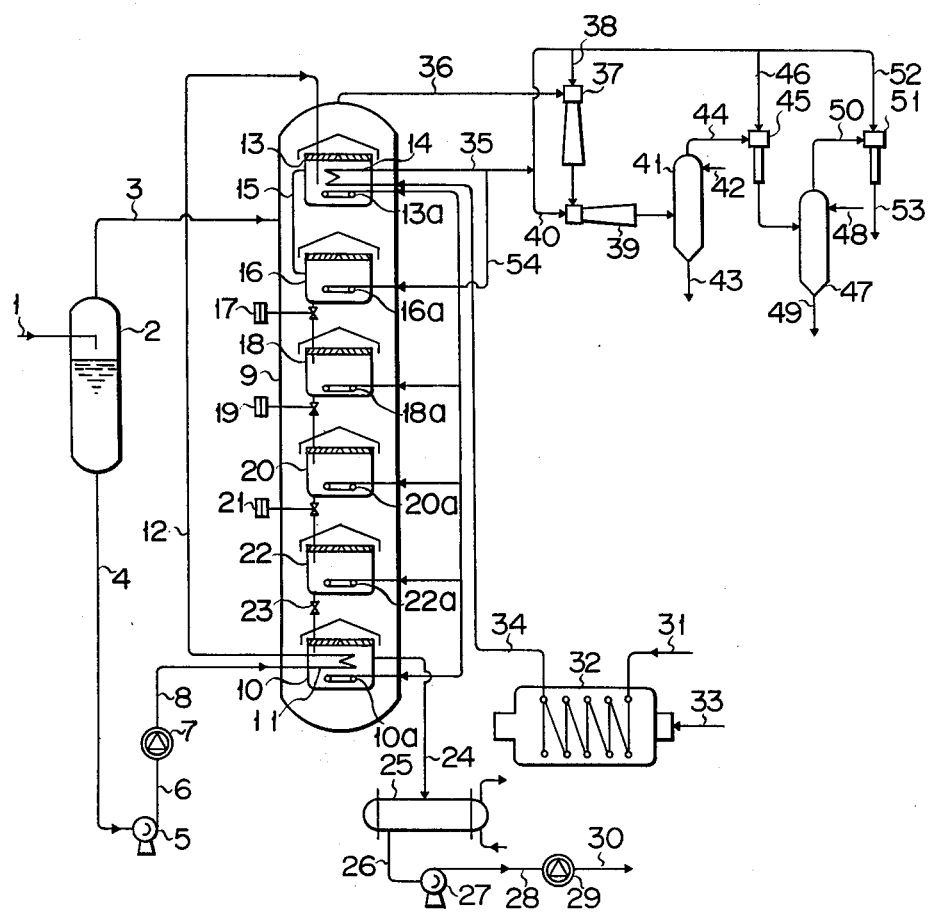

CONTINUOUS DEODORIZING APPARATUS OF FAT AND OIL

BACKGROUND OF THE INVENTION

This invention relates to a continuous deoderizing apparatus of fat and oil, particularly, to those using superheated steam for heating fat and oil to a deodorizing temperature.

The conventional deoderizing system of fat and oil utilizes an organic heat transfer medium such as Dowtherm A, E (trade name by Dow Chemical Co., U.S.A.), SK oil (trade name by Soken Chemical Co., Japan), etc. for heating fat and oil. Such an organic heat transfer medium, however, is poisonous in general. Thus, in order to avoid the danger caused by the mixing of the medium into the eatable fat or oil, it has been strongly desired in the industries to develop suitable heat transfer media replacing organic heat transfer media. To this end, the present inventors previously developed a deodorizing method of fat and oil utilizing hot combustion gases as a heat transfer medium and filed a patent application for the technique (Japanese Patent Application No. 58,409/73). This method can be applied to an existing deodorizing apparatus by a simple revamp, but the requirement of a relatively large gas recirculation equipment renders the method not quite satisfactory when it comes to a large newly installed deodorizing system.

Besides the hot combustion gases mentioned, conceivable as heat transfer media replacing the organic heat transfer media are high pressure steam of 100 to 130 kg/cm$^2$G and hot, pressurized water of 200 to 300° C. These media, however, present problems with respect to the safety in the handling because of their pressures.

The present inventors made an attempt to utilize as the heat transfer medium for heating fat and oil the operating steam of a steam ejector acting as a vacuum producing device for a deodorizing apparatus of fat and oil. The pressure of the operating steam of a steam ejector is in general as low as 8 to 12 kg/cm$^2$G but is high enough to prevent use of a blower or the like. Clearly, the use of such a steam facilitates the operation and maintenance of the apparatus to a markedly high extent. But, it should be noted in this connection that a majority of conventional deodorizing apparatus are of semi-continuous type. In such systems, it is substantially impossible to recover heat from the product stream. It follows that, in order to heat the feedstock fat and oil to a deodorizing temperature by only the steam required for the operation of a steam ejector the steam must be heated up to 600° C or higher. Indeed, it is possible to use a steam of somewhat lower temperature, but in such a case a large amount of steam is required for heating the feedstock up to a deodorizing temperature. It should also be mentioned that the feedstock fat or oil is intermittently heated in a semi-continuous type apparatus. This presents a problem. Where the heating capacity of a steam superheater used is relatively small, it is difficult to maintain a stable operation of the apparatus. In conclusion, it was quite difficult to utilize successfully the operating steam of a steam ejector in a semi-continuous type deodorizing apparatus, in which it is impossible to recover heat from the deodorized product stream.

SUMMARY OF THE INVENTION

The object of this invention is to provide a continuous deodorizing apparatus of fat and oil capable of heating the feedstock fat and oil to a deodorizing temperature by a superheated steam which is used afterwards as the operating steam of a steam ejector.

The continuous deoderizing apparatus according to this invention comprises a deodorizing tower, a steam ejector for reducing the pressure inside the deodorizing tower and a steam superheater. The deodorizing tower consists essentially of a heating tray disposed uppermost of the tower, a charge control tray beneath the heating tray, a heat exchange tray disposed at the bottom of the tower, a discharge control tray just above the heat exchange tray and at least one deodorizing tray disposed between the charge control tray and the discharge control tray. The invented deodorizing apparatus thus constructed is featured in that the superheated steam generated by the steam superheater serves as the heat transfer medium for heating fat and oil in the heating tray of the deodorizing tower and, then, is used as the operating steam of the steam ejector.

BRIEF DESCRIPTION OF THE DRAWING

The appended drawing is a flow diagram of a continuous deodorizing apparatus of fat and oil according to one embodiment of this invention.

DETAILED DESCRIPTION OF THE PREFERRED EMBODIMENTS

In a semi-continuous type deodorizing apparatus which is incapable of recovering heat from the deodorized product stream, it is difficult as described previously to use the operating steam of a steam ejector as the heat transfer medium for heating the feedstock fat and oil to a deodorizing temperature. But, the present inventors have found that the operating steam of a steam ejector heated to 400 to 500° C can be used satisfactorily for heating the feedstock to a deodorizing temperature of 230 to 270° C in a continuous deodorizing apparatus in which the feedstock can be preheated by heat exchange with the product stream.

This invention can be more fully understood when taken in conjunction with the appended drawing. As seen from the drawing a feedstock fat or oil containing odor-emitting substances is continuously supplied to a degassing tank 2 through a feed pipe 1. The degassing tank 2 is connected to a deodorizing tower 9 via a gas-withdrawing pipe 3 and, thus, the pressure inside the tank 2 is kept equal to that inside the deodorizing tower 9 (2 to 6 mmHg). The feedstock from which substantially all the air, water, etc. contained therein have been removed in the degassing tank 2 flows through a pipe 4, a pump 5, another pipe 6, a flow meter 7, and still another pipe 8 into a coil 11 of a heat exchange tray 10 disposed at the bottom of the deodorizing tower 9. During the operation, the deodorizing tower 9, which is of a vertical, cylindrical shape, is kept at a vacuum of 2 to 6 mmHg by the function of a steam ejector described later. Also, the tower 9 houses a plurality of stainless steel trays, of rectangular shape, performing various functions as described later in addition to the heat exchange tray 10.

The feedstock supplied to the coil 11 of the heat exchange tray exchanges heat with the deodorized product having a temperature of 230 to 270° C and flowing through the heat exchange tray. By this heat exchange, the feedstock is preheated to 200 to 220° C and, then, forwarded through a pipe 12 into a heating tray 13 disposed uppermost of the deodorizing tower 9. The heating tray 13 houses a heating coil 14 through which flows a superheated steam of 400° to 500° C generated by a steam superheater 32 described later. Accordingly, the feedstock entering the heating tray 13 at a temperature of 200 to 220° C is further heated up to a deodorizing temperature of 230 to 270° C. The heating tray 13 also houses a steam blowing pipe 13a. The steam blown through the pipe 13a agitates the feedstock, thereby achieving an efficient heating of the feedstock.

The feedstock heated to a deodorizing temperature is continuously supplied through a pipe 15 to a charge control tray 16 and stays there for a predetermined period of time (for example, 10 to 60 minutes). As is the case with the heating tray 13, a steam blowing pipe 16a is housed in the charge control tray 16. The steam blown through the pipe 16a also serves to agitate the feedstock supplied to the charge control tray 16. When amount of the feedstock staying in the tray 16 reaches a predetermined level, a valve 17 is opened to allow the feedstock to fall into a first deodorizing tray 18 in such a short period of time as 2 to 3 minutes.

The feedstock entering the first deodorizing tray 18 stays there for a predetermined period of time (10 to 60 minutes) and is deodorized while being agitated by the steam blown through a steam blowing pipe 18a. A valve 19 is then opened to allow the fat or oil deodorized in the first deodorizing tray 18 to be supplied to a second deodorizing tray 20. As is the case with the first deodorizing tray 18, the deodorized feedstock stays in the second tray 18 for a predetermined period of time (10 to 60 minutes) for further deodorization while being agitated by the steam blown through a steam blowing pipe 20a. A valve 21 is then opened to supply the fully deodorized product to a discharge control tray 22. The product supplied to the discharge control tray 22 is agitated by the steam blown through a steam blowing pipe 22a and continuously supplied through a control valve 23 to the heat exchange tray 10 mentioned earlier.

The product stream entering the heat exchange tray 10 is also agitated by the steam blown through a steam blowing pipe 10a and cooled to 60 to 90° C at the outlet of the tray 10 by the feedstock entering the coil 11 at 40° C. The product stream cooled in the heat exchange tray 10 flows through a pipe 24 into a product cooler 25 for further cooling down to about 40° C and, then, into a storage tank (not shown) through a pipe 26, a pump 27, another pipe 28, a flow meter 29 and still another pipe 30.

Steam of 8 to 12 kg/cm²G used for the operation of a steam ejector is introduced into a steam superheater 32 through an inlet pipe 31 and the superheated steam generated is used as the heat transfer medium for heating the feedstock fat or oil in the heating tray 13. The steam ejector mentioned is a common type vacuum producing device for a deodorizing apparatus. The steam superheater 32 is also of a common structure. Fuel such as heavy oil, kerosene or fuel gas is introduced into the steam superheater 32 through a fuel pipe 33 and burned there for superheating the steam introduced through the inlet pipe 31. The steam superheated to 400 to 500° C is introduced through a pipe 34 into the coil 14 housed in the heating tray 13 so as to exchange heat with the feedstock. The superheated steam is cooled to 230 to 260° C by the heat exchange and, then, comes out of the deodorizing tower 9 through a pipe 35 so as to be utilized as the operating steam of a steam ejector acting as a vacuum producing device.

Generally, a vacuum producing device is connected to a deodorizing tower of fat and oil so as to maintain a predetermined level of vacuum inside the deodorizing tower. A steam ejector is used in general as the vacuum producing device as is the case with the system of this invention.

Referring to the appended drawing, the deodorizing tower 9 is connected via a gas-withdrawing pipe 36 extending from the top of the tower 9 to a vacuum producing device consisting of four-stage steam-jet ejectors 37, 39, 45, 51 with two inter barometric condensers 41, 47. By this vacuum producing device, the pressure inside the deodorizing tower 9 is kept at 2 to 6 mmHg. The first steam ejector (booster ejector) 37 pulls the steam blown into each tray of the tower 9 and the odoremitting substances, water, air, etc. removed from the feedstock fat or oil and coming through the pipe 36. The steam passing through the coil 14 of the heating tray 13 flows through a pipe 38 and is used as the operating steam of the steam ejector 37. The waste materials such as odor-emitting substances, separated in the deodorizing tower 9 is compressed in the steam ejector 37 and, then, forwarded into the second steam ejector (booster ejector) 39 for further compression by the steam introduced through a pipe 40.

The waste materials compressed and pressurized in the second steam ejector 39 are forwarded into the first barometric condenser 41, in which all the condensable substances are condensed by a cooling water introduced through a pipe 42, the condensate being discharged through a pipe 43. The air and the entraining steam inside the barometric condenser 41 are pulled by the third steam ejector 45 through a pipe 44 and forwarded into the second barometric condenser 47 together with the operating steam of the steam ejector 45 coming through a pipe 46. The steam entering the barometric condenser 47 is cooled by a cooling water introduced through a pipe 48 and condensed, the condensate being discharged through a pipe 49. The air and the entraining steam inside the condenser 47 are pulled by the fourth steam ejector 51 through a pipe 50 and discharged into the atmosphere through a pipe 53 together with the operating steam of the ejector 51 introduced through a pipe 52.

In the embodiment shown in the drawing, the agitation steam blown into each tray of the deodorizing tower 9 is taken from the pipe 35 through a pipe 54, rendering it necessary to adjust the steam pressure. But, it is possible to introduce the agitation steam from a steam source prepared separately.

Soybean oil was deodorized by a continuous deodorizing apparatus as shown in the drawing under the conditions listed below:

| Feedstock | Soybean oil |
| --- | --- |
| Through put | 9,200 kg/hr |
| Feedstock temperature | 40° C |
| Deodorizing temperature | 270° C |
| Degree of vacuum (deodorizing tower) | 3 mm Hg |
| Cooling water temperature | 32° C |
| Fuel | Kerosene (10,400 kcal/kg) |

The operating conditions of the deodorizing system were as follows:

| | |
|---|---|
| Feedstock temperature at the outlet of the heat exchange tray | 230° C |
| Product temperature at the outlet of the heat exchange tray | 90° C |
| Heating steam flow rate | 3,365kg/hr |
| Heating steam pressure | 10kg/cm²G |
| Steam temperature at the inlet of the steam superheater | 190° C |
| Steam temperature at the outlet of the steam superheater | 460° C |
| Steam temperature at the outlet of the heating tray | 250° C |
| Steam blowing rate into the trays of the deodorizing tower | 385kg/hr |
| Steam consumption of the steam ejectors | |
| First ejector | 710kg/hr |
| Second ejector | 2,012kg/hr |
| Third ejector | 165kg/hr |
| Fourth ejector | 93kg/hr |
| Total | 2,980kg/hr |
| Cooling water for the barometric condensers | |
| First condenser | 230Tons/hr |
| Second condenser | 8Tons/hr |
| Total | 238Tons/hr |
| Fuel consumption | 62.5kg/hr |

As described above, in the apparatus of this invention the operating steam is superheated to 400° to 500° C without being pressuriaed, and then is used to heat fat or oil to a deodorizing temperature, thereby permitting deodorizing the fat or oil.

The amount of steam required for operating the steam ejector depends on the degree of vacuum of the deodorizing tower, pressure of the operating steam, temperature of the cooling water, etc. Where, for example, the degree of vacuum, the steam pressure and the cooling water temperature are set at 2 mmHg, 10 kg/cm²G and 32° C, repsectively, 435 kg of steam is consumed for processing 1,000 kg of the feedstock.

Where the deodorizing temperature is set at 260° C and the feedstock is preheated to 210° C by heat exchange with the product stream, the amount of heat required for heating the feedstock in the heating tray is 30,000 kcal/ton of feedstock.

Further, if the steam temperature at the outlet of the heating tray is set at 250° C, the steam temperature theoretically required at the inlet of the heating tray is 385° C. Specifically, the enthalpy-temperature diagram of steam indicates that the enthalpy of steam 10 kg/cm²G and 250° C is: $H_{250}$ = 703 kcal/kg. Since the enthalpy of steam required for heating the feedstock is 69 kcal/kg, the enthalpy of the steam necessary at the inlet of the heating tray: $Hx$ = 772 kcal/kg. Accordingly, the steam temperature at the inlet of the heating tray, which is obtained from the enthalpy temperature diagram of steam, is 385° C. In other words, it is possible to heat the feedstock in the heating tray up to the deodorizing temperature by the steam superheated to about 385° C by the steam superheater.

It should also be noted that the pressure of the superheated steam is about 10 kg/cm²G and, thus, the steam can be handled with a high safety.

In the embodiment described, the deodorizing system is constructed to enable the feedstock to exchange heat with the product stream. But, the heat exchange is not necessarily required where the capacity of the deodorizing tower is relatively small (about 4,000kg/hr or less). Instead, the feedstock can be preheated by a preheater as is the case with the common method in this line. In this case, it is advisable to utilize the superheated steam coming from the coil 14 of the heating tray 13 as the heat source of the preheater.

As described in detail, this invention provides a continuous deodorizing system of fat and oil which does not use an organic heat transfer medium such as Dowtherm A, E mentioned earlier by the simple addition of a steam superheater to an existing system. In addition, the deodorizing system provided by this invention is safe to operate and compact.

What we claim is:

1. An apparatus for continuously deodorizing fat and oil, comprising:
   a. a deodorizing tower having an inlet means for supplying a feedstock fat or oil containing an odor-emitting substance, an outlet means for delivering the deodorized fat or oil, the tower housing a heating tray uppermost, a charge control tray beneath the heating tray, a heat exchange tray at the bottom, a discharge control tray just above the heat exchange tray, and at least one deodorizing tray disposed between the charge control tray and the discharge control tray;
   b. a steam ejector for withdrawing the odoremitting substances from the top of the tower; and
   c. a steam superheater for generating a superheated steam which is used as the heat transfer medium for heating the feedstock fat and oil in the heating tray and, then, utilized as the operating stream of the steam ejector.

2. The continuous deodorizing apparatus of fat and oil according to claim 1, wherein the feedstock fat and oil are preheated by heat exchange with the deodorized product stream.

3. The continuous deodorizing apparatus of fat and oil according to claim 1, wherein the feedstock fat and oil are preheated in the heat exchange tray by the superheated steam which acted previously as the heat transfer medium in the heating tray.

4. The continuous deodorizing apparatus of fat and oil according to claim 1, wherein each tray of the deodorizing tower is provided with a steam blowing pipe.

5. The continuous deodorizing apparatus of fat and oil according to claim 4, wherein the superheated steam which previously acted as the heat transfer medium in the heating tray is blown into each tray of the deodorizing tower through each of the steam blowing pipes.

* * * * *